US012578927B2

(12) United States Patent
Hoffmann

(10) Patent No.: US 12,578,927 B2
(45) Date of Patent: Mar. 17, 2026

(54) METHOD FOR CALCULATING A TRANSITION FROM A BOOLEAN MASKING TO AN ARITHMETIC MASKING

(71) Applicant: GIESECKE+DEVRIENT EPAYMENTS GMBH, Munich (DE)

(72) Inventor: Lars Hoffmann, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 50 days.

(21) Appl. No.: 18/569,800

(22) PCT Filed: Jun. 23, 2022

(86) PCT No.: PCT/EP2022/025288
§ 371 (c)(1),
(2) Date: Dec. 13, 2023

(87) PCT Pub. No.: WO2022/268364
PCT Pub. Date: Dec. 29, 2022

(65) Prior Publication Data
US 2024/0272873 A1 Aug. 15, 2024

(30) Foreign Application Priority Data

Jun. 24, 2021 (DE) .................... 10 2021 003 275.6

(51) Int. Cl.
G06F 7/76 (2006.01)
(52) U.S. Cl.
CPC ...... G06F 7/764 (2013.01); G06F 2207/7233 (2013.01)

(58) Field of Classification Search
CPC ............ G06F 7/764; G06F 2207/7233; G06F 21/755; G06F 7/72; G09C 1/00; H04L 9/003; H04L 9/3066; H04W 12/47
See application file for complete search history.

(56) References Cited

U.S. PATENT DOCUMENTS

| | | | |
|---|---|---|---|
| 7,334,133 B2 | 2/2008 | Goubin | |
| 8,707,053 B2 * | 4/2014 | Farrugia | ................. G06F 21/14 |
| | | | 380/42 |
| 9,425,959 B1 * | 8/2016 | Pedersen | ............... H04L 9/3242 |

(Continued)

FOREIGN PATENT DOCUMENTS

| | | |
|---|---|---|
| DE | 102004052196 A1 | 5/2006 |
| DE | 102017002153 A1 | 9/2018 |

(Continued)

OTHER PUBLICATIONS

Goubin, L.: "A Sound Method for Switching between Boolean and Arithmetic Masking"; Cryptographic Hardware and Embedded Systems—CHES 2001, Third International Workshop, Lecture Notes in Computer Science, vol. 2162, Springer-Verlag, May 14-16, 2001, pp. 3-15.

(Continued)

*Primary Examiner* — Harunur Rashid
(74) *Attorney, Agent, or Firm* — Workman Nydegger

(57) ABSTRACT
A method is provided for re-masking from a Boolean mask to an arithmetic mask with a modulus $(2m*p)$, in which m is an integer greater than or equal to zero, and p has at least one prime divisor unequal to 2, so that a carry is generated. The carry is masked or balanced to protect it against intrusion attacks.

15 Claims, 1 Drawing Sheet

(56) References Cited

U.S. PATENT DOCUMENTS

| | | | | |
|---|---|---|---|---|
| 10,333,699 | B1* | 6/2019 | Rohatgi ................. | H04L 9/0662 |
| 11,386,239 | B2 | 7/2022 | Pulkus et al. | |
| 2004/0139136 | A1* | 7/2004 | Goubin ................... | H04L 9/003 |
| | | | | 708/490 |
| 2005/0147243 | A1* | 7/2005 | Baek ......................... | G06F 7/00 |
| | | | | 380/28 |
| 2010/0235417 | A1* | 9/2010 | Baek ........................ | G06F 7/764 |
| | | | | 708/236 |
| 2011/0013767 | A1* | 1/2011 | Kim ...................... | H04L 9/0618 |
| | | | | 380/28 |
| 2011/0055591 | A1* | 3/2011 | Rivain ................. | H04L 9/0631 |
| | | | | 713/189 |
| 2015/0110266 | A1* | 4/2015 | Debraize .............. | H04L 9/3242 |
| | | | | 380/30 |
| 2015/0172042 | A1* | 6/2015 | Karroumi ............ | H04L 9/0625 |
| | | | | 380/28 |
| 2017/0033921 | A1* | 2/2017 | Michiels ............... | G06F 21/105 |
| 2017/0272165 | A1* | 9/2017 | Mansouri Rad ....... | H04B 10/85 |
| 2018/0178578 | A1* | 6/2018 | Tierney ................ | B42D 25/378 |
| 2023/0041237 | A1 | 2/2023 | Bockes et al. | |

FOREIGN PATENT DOCUMENTS

| | | |
|---|---|---|
| DE | 102020000814 A1 | 8/2021 |
| EP | 1596527 B1 | 7/2007 |
| FR | 2999747 A1 | 6/2014 |
| WO | 02065692 A1 | 8/2002 |

OTHER PUBLICATIONS

International Search Report from corresponding PCT Application No. PCT/EP2022/025288, Oct. 17, 2022.

German Search Report from corresponding DE Application No. 102021003275.6, Feb. 7, 2022.

* cited by examiner

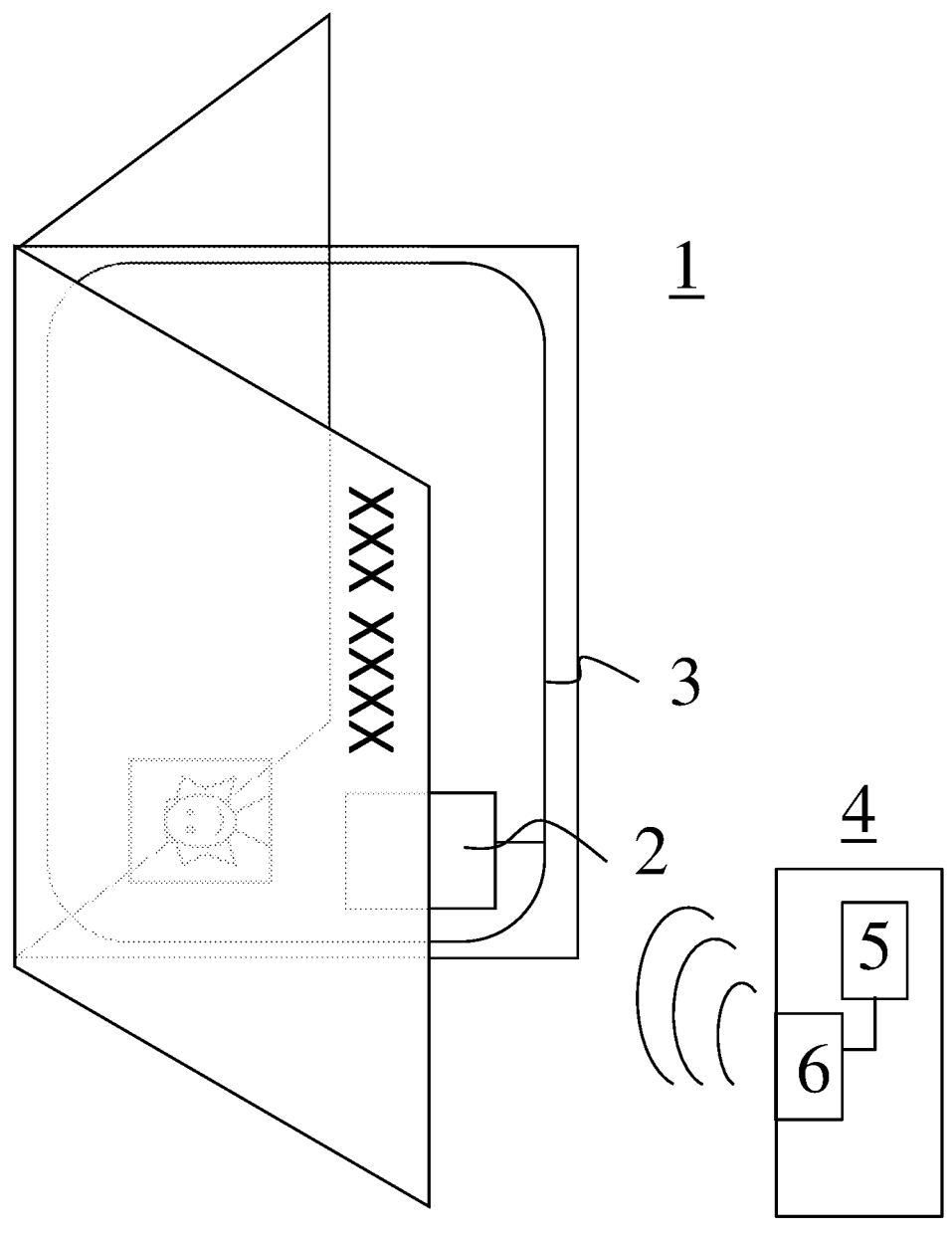

METHOD FOR CALCULATING A TRANSITION FROM A BOOLEAN MASKING TO AN ARITHMETIC MASKING

FIELD OF THE INVENTION

The invention relates to the field of cryptography and, more specifically, to the field of protecting cryptographic calculations against unauthorized intrusion. In particular, the invention relates to the transition from a first masking of a value to be kept secret, which is based on a Boolean masking rule, to a second masking of the value to be kept secret, which is based on an arithmetic masking rule. The invention is particularly suitable for use in a resource-limited system, for example a chip card, such as a payment transaction card or a UICC (cellular SIM card) intended for operation in a cellular terminal, or a SIM chip module eUICC (embedded UICC) intended for permanent installation in a cellular terminal, or an integrated iUICC or Integrated SIM-chip module intended for integration into a chipset of a cellular terminal. The cellular terminal may be, for example, a smartphone or cell phone, or an Internet of Things device (IoT device), or an M2M device, in particular an industrial M2M device (with resource-restricted module: M2M(e) UICC module) or an automotive M2M telematics unit (with resource-limited module: M2M(e)UICC module).

PRIOR ART

In SPA and DPA attacks (SPA=Simple Power Analysis, DPA=Differential Power Analysis) on cryptographic calculations, side-channel emissions from implementations of cryptographic calculations, such as power consumption or electromagnetic radiation from the chip on which the calculation is implemented, are evaluated in order to gain information about confidential data processed in the calculation. In order to defend against SPA and DPA attacks on cryptographic calculations, the confidential data which is processed in a cryptographic calculation is masked, i.e. disguised with a value called a mask, before any cryptographic calculations are performed.

Masking of a value to be kept secret can be based on different masking rules. The masking rule specifies the calculation rule by which the data to be protected is linked to the mask in order to obtain the masked representation of the data to be protected. Which masking rule is appropriate or most appropriate depends on the type of cryptographic calculation, as well as on the individual operations or partial calculations to be performed within the entirety of the cryptographic calculation.

Cases can occur in which, as part of the entirety of a cryptographic calculation, operations or partial calculations are executed consecutively in which different masking rules are more advantageous, or which are even only compatible with different masking rules. In such cases, it is desirable or necessary that a transition between two different masking rules be carried out within the entirety of the cryptographic calculation.

The prior art document WO 02/065692 A1 discloses a method for switching between a Boolean xor operation with a random number r as a first masking rule and a second, additive (arithmetic) masking rule, wherein, in order to implement the transition from the Boolean to the additive masking rule, a sequence of Boolean and arithmetic operations is performed.

The prior art document EP1596527 B1 discloses a method for an intrusion-resistant transition from a first masking of a secret value d to a second masking of the secret value d, wherein the secret value d:—exists in the first masking as a first representation ds masked with a first mask s according to a Boolean masking rule ds=d XOR s, and—in the second masking, exists as a second representation dr masked according to an arithmetic masking rule $dr=(d+r)$ mod $(2^n)$ with a second mask r, where r is calculated such that ds=dr. More precisely, EP1596527 B1 discloses as a concrete embodiment of the invention a first masking d=d XOR z1 and a second masking d=d–z2 mod $2^n$. When switching from the first to the second mask, only the masking is changed, but not the calculation that is masked.

The document BSI-TR-03111 describes an implementation of the PACE protocol for authentication between a machine-readable document as a client and a terminal for reading out the chip of such a machine-readable travel document. In the PACE protocol, a shared secret K is first derived by means of a key derivation function KDF and, based on the shared secret K and a password, two symmetric keys are derived, namely an encryption key Kenc and an authentication key Kmac. The key derivation function KDF is, for example, a Diffie-Hellman (DH) or Elliptical Curve Diffie-Hellman (ECDH) key derivation method, into which asymmetric key pairs of the client and the terminal are entered. In the methods, calculations are carried out modulo a modulus which has at least one prime divisor unequal to two.

In the German patent application DE102020000814A1 by the applicant of the present application, an intrusion-resistant method for key generation is disclosed, configured in a client processor device, by means of which a second public client key $P_c'$ of the client is derived. In particular, the client is a machine-readable travel document. The method for key generation is in particular part of a PACE protocol or a comparable protocol for authentication between a machine-readable travel document as a client on the one hand, and a terminal for reading the chip of such a machine-readable travel document on the other. The PACE protocol authentication uses a second asymmetric key pair $[k_c', P_c']$ of the client, comprising a second public client key $P_c'$ and a second private client key $k_c'$, wherein the first public client key $P_c'$ is formed as a result of an operation which takes the second private client key $k_c'$ and a generator point G on an elliptical curve and a nonce s as input. (In the conventional PACE protocol, the second public client key $P_c'$ is formed by dot multiplication $P_c'=k_c' \cdot G'$ of the second private client key $k_c'$ by the generator point G' mapped onto the elliptical curve with a mapping function).

For the PACE protocol and the method for an improved PACE protocol disclosed in DE102020000814A1, it would also be desirable to have a method for switching from a Boolean masking to an arithmetic masking in order to consistently protect the secret parameters of the PACE protocol.

In particular, in protocols which are composed of symmetric and asymmetric cryptographic methods it can be advantageous to perform a change of mask from data modulo $2^n$ to data modulo p, in which p has a prime divisor unequal to two. For these protocols, the specific examples given in EP1596527 B1 are not applicable.

The prior art document US2015/0172042A1 discloses a method for performing a masked modular addition in which a carry is processed in masked form.

The prior art document US2015/0110266A1 discloses a method comprising a conversion from an arithmetic masking to a Boolean masking, in which a masked carry is processed.

The prior art document DE102004052196A1 discloses a method for performing an operation on masked data in an intrusion-resistant manner, wherein a masked carry is also processed.

The prior art document DE102017002153A1 discloses a method for intrusion-resistant transition from a Boolean masking of a secret value to an additive masking.

The technical article by Goubin, L.: "A Sound Method for Switching between Boolean and Arithmetic Masking; CHES 2001, Lecture Notes in Computer Science, vol. 2162, Springer-Ver-lag, 2001, pp. 3-15, discloses a method for intrusion-resistant re-masking of a secret value from a Boolean masking to an arithmetic masking.

SUMMARY OF THE INVENTION

The object of the invention is to provide a method for intrusion-resistant transition from a Boolean masking to an arithmetic masking using a modulus equal to or comprising p, where p has at least one prime divisor unequal to 2. In particular, the method specified is to be applicable to moduli p, where p is a prime number greater than two.

The object is achieved by a method according to any of the independent claims. In each of the independent claims, the common inventive concept realized is that of integrating a transition from a first modulus $2^n$ to a second modulus p or comprising p into the transition from the first to the second masking. Advantageous embodiments of the invention are specified in the dependent claims.

The method as claimed in claim 1 is designed for intrusion-resistant re-masking of a value x to be kept secret from a first masking to a second masking, by carrying out a plurality of consecutive calculation steps. In this case, before the execution of the plurality of consecutive arithmetic steps, the value x to be kept secret exists in the first masking as a first representation xs masked with a first mask s according to a Boolean masking rule xs=x XOR s mod $2^n$, where $2^n$ is the modulus of the first masking rule and n is an integer. After the execution of the plurality of consecutive arithmetic steps, the secret value x in the second masking exists as a second representation xr masked with a second mask r according to an arithmetic masking rule.

The method is characterized in that, firstly:

$$xr = (x + r) \bmod (2^m * p)$$

$$\text{or } xr = (x - r) \bmod (2^m * p),$$

where ($2^m$*p) is the modulus of the second masking rule and m is an integer greater than or equal to zero, where p has at least one prime divisor unequal to 2;

and secondly:

during the re-masking, at least one arithmetic calculation step is carried out in which a carry $c_1$ is generated over $2^n$, the carry $c_1$ being protected against intrusion by masking or balancing the carry $c_1$ by means of a random information item pm, and in a subsequent calculation step in which the carry $c_1$ is intended for use the masked carry C_pm or the balanced carry C is used instead of the carry.

In the methods described in EP1596527 B1, the carries arising in the calculations are not relevant to the result of the masking change. This is not the case in a transition to a masking rule modulo ($2^m$*p), where p has at least one prime divisor unequal to 2. The occurring carries therefore provide an opportunity for intrusion attacks, which does not exist with a modulus of $2^n$.

According to the invention, the carry $c_1$ is protected against intrusion attacks. The protection of the carry is accomplished either by masking the carry $c_1$ or balancing the carry $c_1$, followed by subsequent calculation with the masked or balanced carry $c_1$, but not with the carry $c_1$, which exists as plain text. This means that the possibility of attack on the calculation formed by the calculation steps, which is opened up by the non-power-of-2 modulus, is closed again.

The modulus ($2^m$*p) of the second masking rule is equal to p in the special case m=0, and also in the special case of a prime number unequal to 2. In the more general case, for other values of m, for example m=1, 2, 3, 4, 5, . . . , the modulus contains a product of a power of two and an integer p which has at least one prime divisor unequal to 2.

Therefore, according to claim 1, a method is provided for intrusion-resistant transition from a Boolean masking to an arithmetic masking using a modulus equal to or comprising p, where p has at least one prime divisor unequal to 2.

In embodiments of the method according to the invention with masking of the carry $c_1$, the carry $c_1$ is optionally masked by means of the random information pm, by processing the carry $c_1$ by means of an XOR operation with the random information pm into $c_1 pm = c_1$ XOR pm, and $c_1 pm$ is used as the masked carry C_pm, or the masked carry C_pm for the subsequent steps is derived from $c_1 pm$.

In embodiments of the method according to the invention with balancing of the carry $c_1$, the carry $c_1$ is optionally balanced by means of random information pm, by representing the secret value x in the second masking as either xr=(x+r) mod ($2^n$*p) or xr=(x−r) mod ($2^n$*p), selected at random under the control of the random information pm, wherein the balanced carry $c_1$ is used as the carry C or the carry C can be derived from the balanced carry $c_1$. This ensures that the frequency of the different values of the carry C for all possible values of r and pm is independent of x.

In embodiments of the method according to the invention with masking or/and balancing of the carry $c_1$, the carry C_pm or C is optionally additively masked by means of a random number z_p, 0<=z_p<p and then reduced, thereby generating an intermediate result sum1zp_p. Subsequently, sum1zp_p is combined with other intermediate results, for example as described in the following detailed exemplary embodiments.

The method according to the invention is particularly useful in key derivation methods in which two parties each derive a shared secret individually, for example Diffie-Hellman (DH) or Elliptical Curve Diffie-Hellman (ECDH), or similar methods, for example ECIES or the like.

The method is particularly useful in machine-readable travel documents, such as passports with a chip (integrated circuit) and an interface, for example an antenna, and for reading such machine-readable travel documents with readers designed for such machine-readable travel documents. The readers have a reader circuit and an interface which is or can be coupled to the reader circuit for communication with machine-readable travel documents.

In particular, the method is useful in the PACE protocol for reading machine-readable travel documents by means of a reader for machine-readable travel documents.

Key derivation methods according to the invention, machine-readable travel documents and readers are configured for methods according to the invention.

5

DETAILED DESCRIPTION OF THE EXEMPLARY EMBODIMENTS

In detail, the protection of the carry $c_1$ is achieved in particular optionally with the following embodiments of the method according to the invention.

1. Balancing I

The second mask r is calculated iteratively for a balanced procedure according to a procedure comprising the following steps:

calculating $MAX\_p=2^n \bmod p$ and $MAX\_p2=2^n+2*p-MAX\_p$ once only;

selecting a random number $z_1$, $0<=z_1<2^n$, selecting a random number $z\_p$, $0<=z\_p<p$;

selecting a random bit pm to balance the carry $c_1$, the value of which is randomly controlled as either 0 or 1;

performing the following steps:

| | |
|---|---|
| 1. | sz1 = z1 XOR s |
| 2. | xz1 = xs XOR sz1 |
| 3. | xsz1 = xs XOR z1 |
| 4. | If pm == 0: |
| | a. add1 = sz1 + $2^n$ |
| | b. sub1c= add1 − z1 |
| | else: |
| | a. add1 = z1 + $2^n$ |
| | b. sub1c= add1 − sz1 |
| 5. | c1 = sub1c >> n |
| 6. | sub1 = sub1c mod $2^n$ |
| 7. | add2 = xsz1 + $2^n$ 8. sub2c = add2 − xz1 |
| 9. | c2 = sub2c >> n |
| 10. | sub2 = subc2 mod $2^n$ |
| 11. | xor1 = sub1 XOR s |
| 12. | r_low = xor1 XOR sub2 |
| 13. | C = c1 XOR c2 |
| 14. | sum1 = (p − C*MAX_p) |
| 15. | sum1zp = sum1 + z_p |
| 16. | sum1zp_p = sum1zp mod p |
| 17. | p_z_p = p − z_p |
| 18. | sum2 = r_low + sum1zp_p |
| 19. | p_sum2 = MAX_p2 − sum2 |
| 20. | If pm == 0: |
| | a. xr = xs + z_p |
| | b. r = sum2 |
| | else: |
| | a. xr = xs + p_z_p |
| | b. r = p_sum2. |

2. Balancing II.

The second mask r is calculated iteratively for a balanced procedure according to a procedure comprising the following steps:

calculating $MAX\_p=2^n \bmod p$ and $MAX\_p2=2^n+2*p-MAX\_p$ once only;

selecting a random number $z_1$, $0<=z_1<2^n$, selecting a random number $z\_p$, $0<=z\_p<p$;

selecting a random bit pm, the value of which is randomly controlled as either 0 or 1;

performing the following steps:

| | |
|---|---|
| 1. | sz1 = z1 XOR s |
| 2. | xz1 = xs XOR sz1 |
| 3. | xsz1 = xs XOR z1 |
| 4. | If pm == 0: |
| | a. add1 = xz1 + $2^n$ |
| | b. sub1c= add1 − sz1 |
| | else: |
| | a. add1 = sz1 + $2^n$ |
| | b. sub1c= add1 − xz1 |
| 5. | c1 = sub1c >> n |
| 6. | sub1 = sub1c mod $2^n$ |

6

-continued

| | |
|---|---|
| 7. | add2 = xsz1 + $2^n$ |
| 8. | sub2c = add2 − z1 |
| 9. | c2 = sub2c >> n |
| 10. | sub2 = subc2 mod $2^n$ |
| 11. | xor1 = sub1 XOR xs |
| 12. | xr_low = xor1 XOR sub2 |
| 13. | C = c1 XOR c2 |
| 14. | sum1 = (p − C*MAX_p) |
| 15. | sum1zp = sum1 + z_p |
| 16. | sum1zp_p = sum1zp mod p |
| 17. | p_z_p = p − z_p |
| 18. | sum2 = xr_low + sum1zp_p |
| 19. | p_sum2 = MAX_p2 − sum2 |
| 20. | If pm == 0: |
| | a. r = s + p_z_p |
| | b. xr = sum2 |
| | else: |
| | a. r = s + z_p |
| | b. xr = p_sum2. |

3. Masking I

The second mask r is calculated iteratively according to a procedure that includes the following steps:

calculating $MAX\_p=2^n \bmod p$ and $MAX\_p2=2^n+2*p-MAX\_p$ once only;

selecting a random number $z_1$, $0<=z_1<2^n$, selecting a random number $z\_p$, $0<=z\_p<p$;

selecting a random bit pm, the value of which is randomly controlled as either 0 or 1;

performing the following steps, comprising a step of masking the carry $c_1$, 14. c1pm=c1 XOR pm:

| | |
|---|---|
| 1. | sz1 = z1 XOR s |
| 2. | xz1 = xs XOR sz1 |
| 3. | xsz1 = xs XOR z1 |
| 4. | add1 = sz1 + $2^n$ |
| 5. | sub1c = add1 − z1 |
| 6. | c1 = sub1c >> n |
| 7. | sub1 = sub1c mod $2^n$ |
| 8. | add2 = xsz1 + $2^n$ |
| 9. | sub2c = add2 − xz1 |
| 10. | c2 = sub2c >> n |
| 11. | sub2 = subc2 mod $2^n$ |
| 12. | xor1 = sub1 XOR s |
| 13. | r_low = xor1 XOR sub2 |
| 14. | c1pm = c1 XOR pm |
| 15. | C_pm = c1pm XOR c2 |
| 16. | sum1 = (p − C_pm*MAX_p) |
| 17. | sum1zp = sum1 + z_p |
| 18. | sum1zp_p = sum1zp mod p |
| 19. | p_ sum1zp_p = p − sum1zp_p |
| 20. | p_z_p = p − z_p |
| 21. | r_low_p = r_low + p |
| 22. | sum2 = r_low_p − pm * MAX_p |
| 23. | If pm == 0: |
| | a. xr = xs + z_p |
| | b. r = sum2 + sum1zp_p |
| | else: |
| | a. xr = xs + p_z_p |
| | b. r = sum2 + p_sum1zp_p . |

4. Masking II

The second mask r is calculated iteratively according to a procedure that includes the following steps:

calculating $MAX\_p=2^n \bmod p$ and $MAX\_p2=2^n+2*p-MAX\_p$ once only;

selecting a random number $z_1$, $0<=z_1<2^n$, selecting a random number $z\_p$, $0<=z\_p<p$;

selecting a random bit pm, the value of which is randomly controlled as either 0 or 1;

performing the following steps, comprising a step of masking the carry $c_1$, 14. c1pm=c1 XOR pm:

| 1. | $sz1 = z1$ XOR s |
| 2. | $xz1 = xs$ XOR $sz1$ |
| 3. | $xsz1 = xs$ XOR $z1$ |
| 4. | $add1 = xsz1 + 2^n$ |
| 5. | $sub1c = add1 - sz1$ |
| 6. | $c1 = sub1c >> n$ |
| 7. | $sub1 = sub1c \bmod 2^n$ |
| 8. | $add2 = xsz1 + 2^n$ |
| 9. | $sub2c = add2 - z1$ |
| 10 | $c2 = sub2c >> n$ |
| 11. | $sub2 = subc2 \bmod 2^n$ |
| 12. | $xor1 = sub1$ XOR $xs$ |
| 13. | $xr\_low = xor1$ XOR $sub2$ |
| 14 | $c1pm = c1$ XOR pm |
| 15. | $C\_pm = c1pm$ XOR $c2$ |
| 16 | $sum1 = (p - C\_pm*MAX\_p)$ |
| 17. | $sum1zp = sum1 + z\_p$ |
| 18 | $sum1zp\_p = sum1zp \bmod p$ |
| 19. | $p\_sum1zp\_p = p - sum1zp\_p$ |
| 20 | $p\_z\_p = p - z\_p$ |
| 21. | $xr\_low\_p = xr\_low + p$ |
| 22. | $sum2 = xr\_low\_p - pm * MAX\_p$ |
| 23. | If pm == 0: |
| | a. $r = s + p\_z\_p$ |
| | b. $xr = sum2 + sum1zp\_p$ |
| | else: |
| | a. $r = s + z\_p$ |
| | b. $xr = sum2 + p\_sum1zp\_p.$ |

In all embodiments of the method, an optional additional step of modular reduction of the masked value xr and the mask r can be carried out, wherein the additional step 21 follows step 20, or the additional step 24 follows step 23, according to:

$$a.\ xr\_p = xr \bmod p$$

$$b.\ r\_p = r \bmod p.$$

BRIEF DESCRIPTION OF THE DRAWINGS

In the following the invention is explained in further detail based on exemplary embodiments and by reference to the drawings, in which:

FIG. 1 shows a system for illustrating the invention.

DETAILED DESCRIPTION OF THE EXEMPLARY EMBODIMENTS

FIG. 1 shows a machine-readable travel document 1 with an integrated circuit 2 and an interface designed as an antenna 3, which is or can be connected to the integrated circuit 2. The integrated circuit 2 is configured for the PACE protocol. The PACE protocol comprises a key derivation method in which the method according to the invention is integrated. The machine-readable travel document 1 can be read out with a suitably configured reader 4, which has a reader circuit 5 and an interface 6, e.g. a corresponding antenna. Such readers 4 for machine-readable travel documents such as the machine-readable travel document 1 are arranged, for example, at control stations such as airports or border crossings.

The invention claimed is:

1. A method for intrusion-resistant re-masking by a processor device of a value x to be kept secret from a first masking to a second masking, by carrying out a plurality of calculation steps, wherein the secret value x:

exists in the first masking, before execution of the plurality of calculation steps, as a first representation xs masked with a first mask s according to a Boolean masking rule $xs=x$ XOR $s \bmod 2n$, where 2n is a modulus of a first masking rule, where n is an integer, and in the second masking, after the execution of the plurality of calculation steps, exists as a second representation xr masked according to an arithmetic masking rule with a second mask r, wherein:

$xr=(x+r) \bmod (2m*p)$ or $xr=(x-r) \bmod (2m*p)$, where $(2m*p)$ is a modulus of a second masking rule and m is an integer greater than or equal to zero, where p has at least one prime divisor unequal to 2; and during the re-masking, at least one calculation step of the plurality of calculation steps is carried out by the processor device, in which a carry c1 is generated over 2n, the carry c1 being protected against intrusion attacks by masking or balancing the carry c1 by means of a random information item pm, and in a subsequent calculation step in which the carry c1 is intended for use, the masked carry C_pm or the balanced carry C is used instead of the carry c1;

the method further comprising transmitting a cryptographic message based on the value x from the processor device to another processing device.

2. The method according to claim 1, wherein the carry c1 is masked by means of the random information pm, by processing the carry c1 by means of an XOR operation with the random information pm to $c1pm=c1$ XOR pm, and c1pm is used as the masked carry C_pm, or the masked carry C_pm is derived from c1pm.

3. The method according to claim 2, wherein the carry C_pm or C by means of a random number z_p, $0<=z\_p<p$, is additively masked and then reduced, wherein an intermediate result sum1zp_p is generated, and wherein in subsequent steps further calculations use the intermediate result sum1zp_p instead of the carry C_pm or C.

4. The method according to claim 3, wherein the second mask r is iteratively calculated according to a procedure comprising the following steps:

calculating $MAX\_p=2n \bmod p$ and $MAX\_p2=2n+2*p-MAX\_p$ once only;

selecting a random number z1, $0<=z1<2n$, selecting a random number z_p, $0<=z\_p<p$;

selecting a random bit pm, the value of which is randomly controlled as either 0 or 1;

performing the following steps, comprising a step of masking the carry c1, 14, $c1pm=c1$ XOR pm:

| 1. | $sz1 = z1$ XOR s |
| 2. | $xz1 = xs$ XOR $sz1$ |
| 3. | $xsz1 = xs$ XOR $z1$ |
| 4. | $add1 = sz1 + 2n$ |
| 5. | $sub1c = add1 - z1$ |
| 6. | $c1 = sub1c >> n$ |
| 7. | $sub1 = sub1c \bmod 2n$ |
| 8. | $add2 = xsz1 + 2n$ |
| 9. | $sub2c = add2 - xz1$ |
| 10. | $c2 = sub2c >> n$ |
| 11. | $sub2 = subc2 \bmod 2n$ |
| 12. | $xor1 = sub1$ XOR s |
| 13. | $r\_low = xor1$ XOR $sub2$ |
| 14. | $c1pm = c1$ XOR pm |
| 15. | $C\_pm = c1pm$ XOR $c2$ |
| 16. | $sum\ 1 = (p - C\_pm*MAX\_p)$ |

9
-continued

| | |
|---|---|
| 17. | sum1zp = sum1 + z_p |
| 18. | sum1zp_p = sum1zp mod p |
| 19. | p_ sum1zp_p = p − sum1zp_p |
| 20. | p_z_p = p − z_p |
| 21. | r_low_p = r_low + p |
| 22. | sum2 = r_low_p − pm * MAX_p |
| 23. | If pm == 0: |
| a. | xr = xs + z_p |
| b. | r = sum2 + sum1zp_p |
| else: | |
| a. | xr = xs + p_z_p |
| b. | r = sum2 + p_sum1zp_p. |

5. The method according to claim 4, further comprising step 24 of performing a modular reduction of the masked value xr and the mask r according to $$a.\ xr\_p = xr \bmod p$$

$$b.\ r\_p = r \bmod p.$$

6. The method according to claim 3, wherein the second mask r is iteratively calculated according to a procedure comprising the following steps:

calculating MAX_p=2n mod p and MAX_p2=2n+2*p−MAX_p once only;

selecting a random number z1, $0<=z1<2n$, selecting a random number z_p, $0<=z\_p<p$;

selecting a random bit pm, the value of which is randomly controlled as either 0 or 1;

performing the following steps, comprising a step of masking the carry c1, 14, c1pm=c1 XOR pm:

| | |
|---|---|
| 1. | sz1 = z1 XOR s |
| 2. | xz1 = xs XOR sz1 |
| 3. | xsz1 = xs XOR z1 |
| 4. | add1 = xsz1 + 2n |
| 5. | sub1c = add1 − sz1 |
| 6. | c1 = sub1c >> n |
| 7. | sub1 = sub1c mod 2n |
| 8. | add2 = xsz1 + 2n |
| 9. | sub2c = add2 − z1 |
| 10. | c2 = sub2c >> n |
| 11. | sub2 = subc2 mod 2n |
| 12. | xor1 = sub1 XOR xs |
| 13. | xr_low = xor1 XOR sub2 |
| 14. | c1pm = c1 XOR pm |
| 15. | C_pm = c1pm XOR c2 |
| 16. | sum1 = (p − C_pm*MAX_p) |
| 17. | sum1zp = sum1 + z_p |
| 18. | sum1zp_p = sum1zp mod p |
| 19. | p_ sum1zp_p = p − sum1zp_p |
| 20. | p_z_p = p − z_p |
| 21. | xr_low_p = xr_low + p |
| 22. | sum2 = xr_low_p − pm * MAX_p |
| 23. | If pm == 0: |
| a. | r = s + p_z_p |
| b. | xr = sum2 + sum1zp_p |
| else: | |
| a. | r = s + z_p |
| b. | xr = sum2 + p_sum1zp_p. |

7. The method according to claim 6, further comprising step 24 of performing a modular reduction of the masked value xr and the mask r according to $$xr\_p = xr \bmod p \qquad a.$$

10
-continued
$$r\_p = r \bmod p. \qquad b.$$

8. The method according to claim 1, wherein the carry c1 is balanced by means of random information pm, by representing the secret value x in the second masking as either xr=(x+r) mod (2n*p) or xr=(x−r) mod (2n*p), selected at random under the control of the random information pm, wherein in the balanced carry c1 is used as the carry C or the carry C can be derived from the balanced carry c1.

9. The method according to claim 8, wherein the carry C_pm or C by means of a random number z_p, ($<=z\_p<p$, is additively masked and then reduced, wherein an intermediate result sum1zp_p is generated, and wherein in subsequent steps further calculations use the intermediate result sum1zp_p instead of the carry C_pm or C, wherein the second mask r is iteratively calculated according to a procedure comprising the following steps:

calculating MAX_p=2n mod p and MAX_p2=2n+2*p−MAX_p once only;

selecting a random number z1, $0<=z1<2n$, selecting a random number z_p, $0<=z\_p<p$;

selecting a random bit pm, the value of which is randomly controlled as either 0 or 1;

performing the following steps:

| | |
|---|---|
| 1. | sz1 = z1 XOR s |
| 2. | xz1 = xs XOR sz1 |
| 3. | xsz1 = xs XOR z1 |
| 4. | If pm == 0: |
| a. add1 | = sz1 + 2n |
| b. sub1c= | add1 − z1 |
| else: | |
| a. add1 | = z1 + 2n |
| b. sub1c= | add1 − sz1 |
| 5. | c1 = sub1c >> n |
| 6. | sub1 = sub1c mod 2n |
| 7. | add2 = xsz1 + 2n |
| 8. | sub2c = add2 − xz1 |
| 9. | c2 = sub2c >> n |
| 10. | sub2 = subc2 mod 2n |
| 11. | xor1 = sub1 XOR s |
| 12. | r_low = xor1 XOR sub2 |
| 13. | C = c1 XOR c2 |
| 14. | sum1 = (p − C*MAX_p) |
| 15. | sum1zp = sum1 + z_p |
| 16. | sum1zp_p = sum1zp mod p |
| 17. | p_z_p = p − z_p |
| 18. | sum2 = r_low + sum1zp_p |
| 19. | p_sum2 = MAX_p2 − sum2 |
| 20. | If pm == 0: |
| a. xr = xs + z_p | |
| b. r = sum2 | |
| | else: |
| a. xr = xs + p_z_p | |
| b. r = p_sum2. | |

10. The method according to claim 9, further comprising step 21, of performing a modular reduction of the masked value xr and the mask r according to $$a.\ xr\_p = xr \bmod p$$

$$b.\ r\_p = r \bmod p.$$

11. The method according to claim 8, wherein the carry C_pm or C by means of a random number z_p, $0<=z\_p<p$, is additively masked and then reduced, wherein an intermediate result sum1zp_p is generated, and wherein in subsequent steps further calculations use the intermediate result sum1zp_p instead of the carry C_pm or C, wherein the second mask r is iteratively calculated according to a procedure comprising the following steps:

calculating MAX_p=2n mod p and

MAX_p2=2n+2*p-MAX_p once only;

selecting a random number z1, $0<=z1<2n$, selecting a random number z_p, $0<=z\_p<p$;

selecting a random bit pm, the value of which is randomly controlled as either 0 or 1;

performing the following steps:

| 1. | sz1 = z1 XOR s |
|---|---|
| 2. | xz1 = xs XOR sz1 |
| 3. | xsz1 = xs XOR z1 |
| 4. | If pm == 0: |
| a. add1 = xz1 + 2n | |
| b. sub1c= add1 − sz1 | |
| | else: |
| a. add1 = sz1 + 2n | |
| b. sub1c= add1 − xz1 | |
| 5. | c1 = sub1c >> n |
| 6. | sub1 = sub1c mod 2n |
| 7. | add2 = xsz1 + 2n |
| 8. | sub2c = add2 − z1 |
| 9. | c2 = sub2c >> n |
| 10. | sub2 = subc2 mod 2n |
| 11. | xor1 = sub1 XOR xs |
| 12. | xr_low = xor1 XOR sub2 |
| 13. | C = c1 XOR c2 |
| 14. | sum1 =(p − C*MAX_p) |
| 15. | sum1zp = sum1 + z_p |
| 16. | sum1zp_p = sum1zp mod p |
| 17. | p_z_p = p − z_p |
| 18. | sum2 = xr_low + sum1zp_p |
| 19. | p_sum2 = MAX_p2 − sum2 |
| 20. | If pm == 0: |
| a. r = s + p_z_p | |
| b. xr = sum2 | |
| | else: |
| a. r = s + z_p | |
| b. xr = p_sum2. | |

12. The method according to claim 11, further comprising step 21 of performing a modular reduction of the masked value xr and the mask r according to a. xr_p=xr mod p b. r_p=r mod p.

13. A key-derivation method, designed as a DH or ECDH key-derivation method or similar key-derivation method, comprising intrusion-resistant re-masking by a processor device of a value x to be kept secret from a first masking to a second masking, by carrying out a plurality of calculation steps, wherein the secret value x:

exists in the first masking, before execution of the plurality of calculation steps, as a first representation xs masked with a first mask s according to a Boolean masking rule xs=x XOR s mod 2n, where 2n is a modulus of a first masking rule, where n is an integer, and in the second masking, after the execution of the plurality of calculation steps, exists as a second representation xr masked according to an arithmetic masking rule with a second mask r, wherein:

sr=(x+r) mod (2m*p) or xr=(x−r) mod (2m*p), where (2m*p) is a modulus of a second masking rule and m is an integer greater than or equal to zero, where p has at least one prime divisor unequal to 2; and during the re-masking, at least one calculation step of the plurality of calculation steps is carried out by the processor device, in which a carry c1 is generated over 2n, the carry c1 being protected against intrusion attacks by masking or balancing the carry c1 by means of a random information item pm, and in a subsequent calculation step in which the carry c1 is intended for use, the masked carry C_pm or the balanced carry C is used instead of the carry c1;

the method further comprising transmitting a key based on the value x from the processor device to another processing device.

14. A machine-readable document comprising an integrated circuit, and an interface for communication with a reader, wherein the integrated circuit is configured to perform intrusion-resistant re-masking of a value x to be kept secret from a first masking to a second masking, by carrying out a plurality of calculation steps, wherein the secret value x:

exists in the first masking, before execution of the plurality of calculation steps, as a first representation xs masked with a first mask s according to a Boolean masking rule xs=x XOR s mod 2n, where 2n is a modulus of a first masking rule, where n is an integer, and in the second masking, after the execution of the plurality of calculation steps, exists as a second representation xr masked according to an arithmetic masking rule with a second mask r, wherein:

xr=(x+r) mod (2m*p) or xr=(x−r) mod (2m*p), where (2m*p) is a modulus of a second masking rule and m is an integer greater than or equal to zero, where p has at least one prime divisor unequal to 2;

during the re-masking, at least one calculation step of the plurality of calculation steps is carried out by the integrated circuit, in which a carry c1 is generated over 2n, the carry c1 being protected against intrusion attacks by masking or balancing the carry c1 by means of a random information item pm, and in a subsequent calculation step in which the carry c1 is intended for use, the masked carry C_pm or the balanced carry C is used instead of the carry c1;

the integrated circuit configured to transmit a key based on the value x to the reader using the interface for communication.

15. A reader comprising a reader circuit and an interface for communication with a machine-readable document and configured for reading a machine-readable document according to claim 14.

* * * * *